July 28, 1936.  F. G. WILLIAMS  2,048,720
SEA WATER THERMOMETER
Filed Sept. 12, 1933
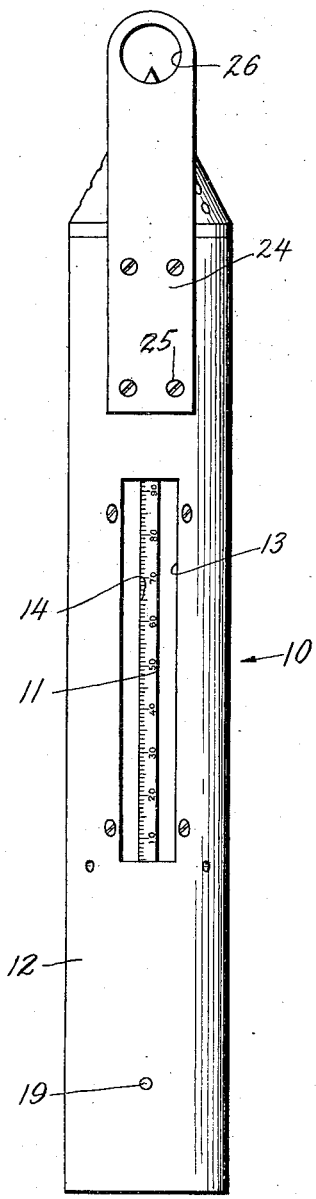
Fig. 1.
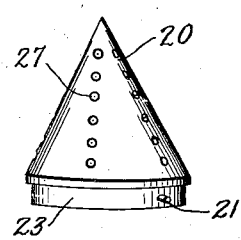
Fig. 4.
Fig. 3.
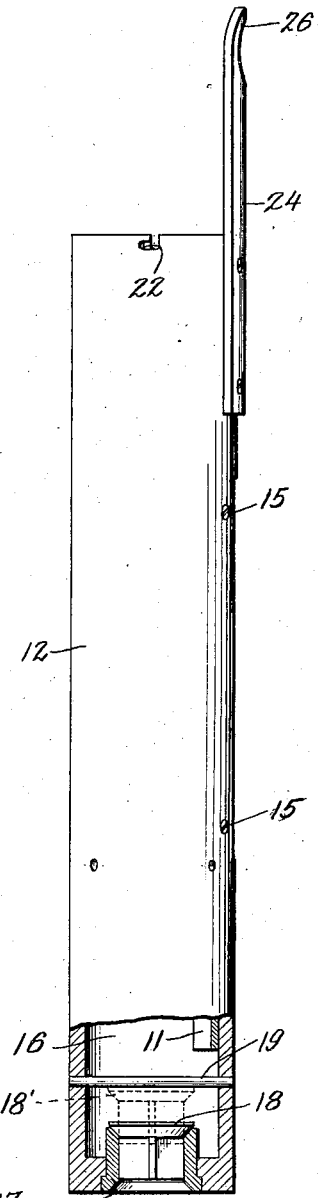
Fig. 2.
INVENTOR
FRANKLIN G. WILLIAMS
BY
Harold Dodd
ATTORNEY Patented July 28, 1936

2,048,720

UNITED STATES PATENT OFFICE 2,048,720

SEA WATER THERMOMETER

Franklin G. Williams, Washington, D. C.

Application September 12, 1933, Serial No. 689,118

1 Claim. (Cl. 73—52)

(Granted under the act of March 3, 1883, as amended April 30, 1928; 370 O. G. 757)

This invention relates to a sea water thermometer and has for an object to provide an improved sea water thermometer especially adapted for obtaining sea water temperature readings at any desired depth.

A further object of this invention is to provide a thermometer holding case which will expose the thermometer to the temperature of the sea at the lowermost depth.

A further object of this invention is to provide an improved holding case for a sea water thermometer which will allow the sea water to gain access to the thermometer as it is being lowered and which when the lofermost depth is reached will retain the sea water that has entered the holder at that depth within the case as it is withdrawn.

A further object of this invention is to provide a sea water thermometer holding case which will have an opening valve that will permit the sea water to gain access to the thermometer as it is being lowered and that will close as the thermometer is raised to prevent any change therein.

With the above and other objects in view the invention consists in the construction, combination and arrangement of parts as will be described more fully hereinafter.

Reference is to be had to the accompanying drawing forming a part of this specification in which like reference characters indicate corresponding parts throughout the several views, and in which:

Fig. 1 is a front plan view of the sea water thermometer in reading position;

Fig. 2 is a side view of Fig. 1, the bottom of the thermometer case being partly broken away;

Fig. 3 is a perspective view of the valve shown at the bottom of Fig. 2; and

Fig. 4 is an elevational view of a removable cap from the thermometer.

There is shown at 10 the sea water thermometer constituting this invention. This sea water thermometer comprises a thermometer 11 which is mounted within a tubular shaped holding member 12 of heavy gauge metal as shown, the tubular holding member 12 having a window opening 13 therein, permitting the graduations 14 on the thermometer 11 to be readable therethrough. The thermometer 11 is mounted in the holder 12 by means of stud screws 15 passing therethrough. The bottom of the thermometer 11 projects into a well 16 formed in the bottom of the holder 12. Projecting through the bottom of the well 16 is a valve seat 17 in which is mounted a poppet valve 18 for vertical opening movements, the upward movement of the poppet valve 18 being limited by the pin 19 extending through the holder 12.

A conical perforated cap 20 has a pair of bayonet pins 21 which cooperate with bayonet jointed slots 22 on the top of the holder 12, the pins 21 projecting from an internal flange 23 whereby the cap 20 may be securely mounted on top of the holder 12. A strap 24 secured to the holder 12 by means of stud screws 25 has an eye 26 formed therein, providing means for receiving the end of a lowering cable.

In operation the sea water thermometer 10 is secured by means of eye 26 to a suitable lowering cable, and the thermometer is then lowered into the water to the desired depth. As the thermometer 10 is lowered through the water the poppet valve 18 rises to the position 18' allowing the sea water to enter into the well 16 and circulate through the holder and out through the perforations 27 in the conical cap 20. When the thermometer 10 has been lowered to the desired depth, it will be held stationary a moment thereby permitting the poppet valve 18 to return to the closed position, thus entrapping the sea water in the well 16. The thermometer is then quickly raised, the closed poppet valve 18 then preventing the circulation of any water through the thermometer and entrapping the sample of sea water in the well 16, thereby keeping the thermometer 11 at the same reading as it had at the desired depth. The thermometer on being raised will then be read and the temperature recorded in the usual manner.

It will be understood that the above description and accompanying drawing comprehend only the general and preferred embodiment of this invention, and that various changes in construction, proportion and arrangement of parts may be made within the scope of the appended claims, and without sacrificing any of the advantages of this invention.

The herein described invention may be manufactured and used by or for the Government of the United States of America for governmental purposes without the payment of any royalties thereon or therefor.

I claim:

A sea water thermometer adaptable to be suspended from a moving ship to penetrate the sea to great depths and register temperature at the lowermost depth, comprising a weighty tubular holding member of heavy gauge metal, a thermometer firmly and protectedly secured within said tubular member, a closure member on the bottom of said tubular member, a valve seat member extending through said closure member, an upwardly-openable closure member comprising a poppet valve seatable on said valve seat member, a pin extending transversely of said tubular member limiting the upward movement of said poppet valve, a vertical window in said tubular member disposed opposite said thermometer, a detachable apertured top closure member secured to said tubular member, an apertured metal strap secured to said tubular member adapted to receive a lowering cable whereby said sea water thermometer may be lowered to a great depth and permit circulation of the sea up through the open poppet valve and out through the apertured top as the thermometer is being lowered and to entrap said sea water at the lowermost depth reached, so as to maintain the thermometer at the temperature of the lowermost depth so that it may be raised and read.

FRANKLIN G. WILLIAMS.